US010845120B1

(12) United States Patent
Macchio

(10) Patent No.: US 10,845,120 B1
(45) Date of Patent: Nov. 24, 2020

(54) SYSTEMS AND METHODS FOR ENVIRONMENTALLY-CLEAN THERMAL DRYING

(71) Applicant: Steve Macchio, Lindenhurst, NY (US)

(72) Inventor: Steve Macchio, Lindenhurst, NY (US)

(*) Notice: Subject to any disclaimer, the term of this patent is extended or adjusted under 35 U.S.C. 154(b) by 93 days.

(21) Appl. No.: 15/909,168

(22) Filed: Mar. 1, 2018

(51) Int. Cl.
| F26B 3/00 | (2006.01) |
| F26B 23/02 | (2006.01) |
| F23G 7/05 | (2006.01) |
| F26B 25/00 | (2006.01) |
| F26B 17/04 | (2006.01) |

(52) U.S. Cl.
CPC ............ *F26B 23/02* (2013.01); *F23G 7/05* (2013.01); *F26B 17/04* (2013.01); *F26B 25/001* (2013.01); *F26B 2200/02* (2013.01)

(58) Field of Classification Search
CPC ...... F26B 3/00; F26B 3/02; F26B 3/04; F26B 3/06; F26B 23/02; F26B 23/028; F26B 2200/02; F23G 7/05
USPC .................................. 34/485, 482, 443, 486
See application file for complete search history.

(56) References Cited

U.S. PATENT DOCUMENTS

| 4,751,887 A * | 6/1988 | Terry ................. F23G 5/16 110/211 |
| 5,052,313 A * | 10/1991 | Walker ............... F23G 5/006 110/204 |
| 5,428,906 A | 7/1995 | Lynam et al. |
| 5,775,004 A * | 7/1998 | Steier ................ F26B 1/00 34/424 |
| 7,758,235 B1 | 7/2010 | Collette |
| 8,844,157 B2 | 9/2014 | Wagner, Jr. et al. |
| 8,956,539 B2 | 2/2015 | Smith et al. |
| 9,239,187 B2 * | 1/2016 | Pepitone ............ F26B 3/24 |
| 9,725,652 B2 | 8/2017 | Noureldin et al. |
| 2004/0040174 A1 * | 3/2004 | Childs ............... F26B 23/028 34/380 |
| 2005/0252636 A1 | 11/2005 | Kauppila et al. |
| 2005/0274293 A1 | 12/2005 | Morton et al. |
| 2006/0010708 A1 | 1/2006 | Carin et al. |

(Continued)

FOREIGN PATENT DOCUMENTS

CN        102659460 A    9/2012

OTHER PUBLICATIONS

International Search Report and Written Opinion issued in corresponding Application No. PCT/US2019/018002 dated Apr. 11, 2019.

*Primary Examiner* — John P McCormack
(74) *Attorney, Agent, or Firm* — Carter, DeLuca & Farrell LLP

(57) ABSTRACT

The present disclosure relates to environmentally-clean thermal drying systems and methods. In accordance with one aspect, a method for thermal drying includes receiving a grease-related waste, burning the grease-related waste in a furnace to generate heat energy, receiving a bio-waste in an indirect dryer at an adjustable feed rate, drying the bio-waste in the indirect dryer using at least some of the heat energy, and metering the bio-waste into the indirect dryer at the adjustable feed rate. The adjustable feed rate is adjusted based on a percentage of solids of the bio-waste before entering the indirect dryer and a temperature within the indirect dryer, where the indirect dryer and the adjustable feed rate are coordinated to achieve a predetermined percentage of solids in a dried bio-waste exiting the indirect dryer.

21 Claims, 7 Drawing Sheets

(56) References Cited

U.S. PATENT DOCUMENTS

| | | | |
|---|---|---|---|
| 2009/0293568 A1* | 12/2009 | Macchio | C05F 7/00 71/12 |
| 2013/0074357 A1* | 3/2013 | Wagner, Jr. | F26B 7/00 34/282 |
| 2015/0159105 A1* | 6/2015 | Sethi | C10B 49/10 44/590 |
| 2016/0045841 A1 | 2/2016 | Kaplan et al. | |

* cited by examiner

SYSTEMS AND METHODS FOR ENVIRONMENTALLY-CLEAN THERMAL DRYING

TECHNICAL FIELD

The present disclosure relates to thermal drying, and more particularly, to environmentally-clean thermal drying systems and methods.

BACKGROUND

Thermal drying is used in various types of product production. There are various fuels for thermal drying and various ways to perform thermal drying. However, certain fuels and drying processes introduce excessive pollutants into the environment. For example, fuels such as coal and oil introduce excessive pollutants when used as the sole fuel source. Additionally, drying processes that involve passing hot air over a work product may pick up contaminants from the work product and introduce such contaminants into the environment. Accordingly, there is continuing interest in improving thermal drying in product production to reduce environmental impact and increase controls.

SUMMARY

The present disclosure relates to environmentally-clean thermal drying systems and methods. In accordance with aspects of the present disclosure, heat generated by burning a grease-related waste and/or oily waste is used to thermally dry bio-waste and convert the bio-waste into natural fertilizer, which can be a natural organic fertilizer. Byproducts of the thermal drying, such as exhaust and ash, are processed before they are released or introduced into the environment.

In accordance with one aspect of the present disclosure, a method for thermal drying includes receiving a grease-related waste, burning the grease-related waste in a furnace to generate heat energy, receiving a bio-waste in an indirect dryer at an adjustable feed rate, drying the bio-waste in the indirect dryer using at least a portion of the heat energy, and metering the bio-waste into the indirect dryer at the adjustable feed rate. The adjustable feed rate is adjusted based on a percentage of solids of the bio-waste entering the indirect dryer and a temperature within the indirect dryer, and the indirect dryer and the adjustable feed rate are coordinated to achieve a predetermined percentage of solids in a dried bio-waste exiting the indirect dryer. In various embodiments, the method includes adjusting the temperature within the indirect dryer and/or a retention time of the bio-waste in the indirect dryer.

In various embodiments, the predetermined percentage of solids in the dried bio-waste exiting the indirect dryer is between 90% and 100%. In various embodiments, the method includes transferring the dried bio-waste to a loading station via a cooling conveyor. In various embodiments, the method includes indirectly cooling the dried bio-waste exiting the indirect dryer using a cool-water conduit loop coupled to the cooling conveyor.

In various embodiments, the grease-related waste includes one or more of a yellow grease, a brown grease, or a dewatered grease cake. In various embodiments, the bio-waste includes municipal sewage sludge.

In various embodiments, the heat energy is in the form of heated air, and drying the bio-waste in the indirect dryer using at least a portion of the heat energy includes heating a first portion of an oil-circulating conduit using the heated air to heat oil contained within the oil-circulating conduit, where the first potion is outside the indirect dryer and a second portion of the oil-circulating conduit is located within the indirect dryer, and circulating the heated oil through the second portion of the oil-circulating conduit within the indirect dryer. In various embodiments, the second portion of the oil-circulating conduit is a hollow auger of the indirect dryer.

In various embodiments, the method includes conveying heated gases from the indirect dryer to the furnace through a gas conduit using negative pressure, such that the indirect dryer does not include any waste liquid or condensate discharge line, and destroying, in the furnace, volatile organic compounds and odors in the heated gases conveyed from the indirect dryer to the furnace. In various embodiments, the furnace generates the heat energy based in part on the heated gases conveyed from the indirect dryer to the furnace. In various embodiments, the method includes cleaning exhaust gases from the furnace, where the exhaust gases include at least some of the gases conveyed from the indirect dryer to the furnace.

In one aspect of the present disclosure, a system for thermal drying includes a storage tank storing a grease-related waste, a furnace that receives and burns the grease-related waste to generate heat energy, an indirect dryer that receives a bio-waste and that utilizes at least a portion of the heat energy to dry the bio-waste, and a pump that meters the bio-waste into the indirect dryer at an adjustable feed rate. The adjustable feed rate is adjusted based on a percentage of solids of the bio-waste entering the indirect dryer and a temperature within the indirect dryer. The indirect dryer and the adjustable feed rate are coordinated to achieve a predetermined percentage of solids in a dried bio-waste exiting the indirect dryer. In various embodiments, the system includes a controller configured to adjust the temperature within the indirect dryer and/or a retention time of the bio-waste in the indirect dryer.

In various embodiments, the predetermined percentage of solids in the dried bio-waste exiting the indirect dryer is between 90% and 100%. In various embodiments, the system includes a cooling conveyor operatively coupled to the indirect dryer, where the cooling conveyor transfers the dried bio-waste to a loading station. In various embodiments, the system includes a cool-water conduit loop coupled to the cooling conveyor, where the cool-water conduit indirectly cools the dried bio-waste.

In various embodiments, the grease-related waste includes one or more of a yellow grease, a brown grease, or a dewatered grease cake. In various embodiments, the bio-waste includes municipal sewage sludge.

In various embodiments, the heat energy is in the form of heated air, and the system further includes an oil-circulating conduit containing oil, an oil heat exchanger operatively coupled to the furnace and to a first portion of the oil-circulating conduit, where the oil heat exchanger heats the oil within the oil-circulating conduit using the heated air. The first portion of the oil-circulating conduit is outside the indirect dryer, and a second portion of the oil-circulating conduit is within the indirect dryer. An oil-circulating pump coupled to the oil-circulating conduit circulates the heated oil through the second portion of the oil-circulating conduit within the indirect dryer. In various embodiments, the second portion of the oil-circulating conduit is a hollow auger of the indirect dryer.

In various embodiments, the system includes a gas conduit coupled between the indirect dryer and the furnace, where gases from the indirect dryer are conveyed to the furnace through the gas conduit by negative pressure such that the indirect dryer does not include any waste liquid or condensate discharge line. In various embodiments, the furnace generates the heat energy based in part on the heated gases conveyed from the indirect dryer to the furnace, and destroys volatile organic compounds and odors in the heated gases conveyed from the indirect dryer to the furnace. In various embodiments, the system includes a bag house operatively coupled to the furnace that cleans exhaust gases from the furnace, where the exhaust gases include at least some of the gases conveyed from the indirect dryer to the furnace.

Further details and aspects of exemplary embodiments of the present disclosure are described in more detail below with reference to the appended figures.

DETAILED DESCRIPTION

The present disclosure relates to environmentally-clean thermal drying systems and methods. In accordance with aspects of the present disclosure, heat generated by burning grease-related waste and/or oily waste is used to thermally dry bio-waste and convert the bio-waste into natural fertilizer, which can be a natural organic fertilizer. Additionally, byproducts of the thermal drying, such as exhaust and ash, are processed before they are released or introduced into the environment.

Figure 1:
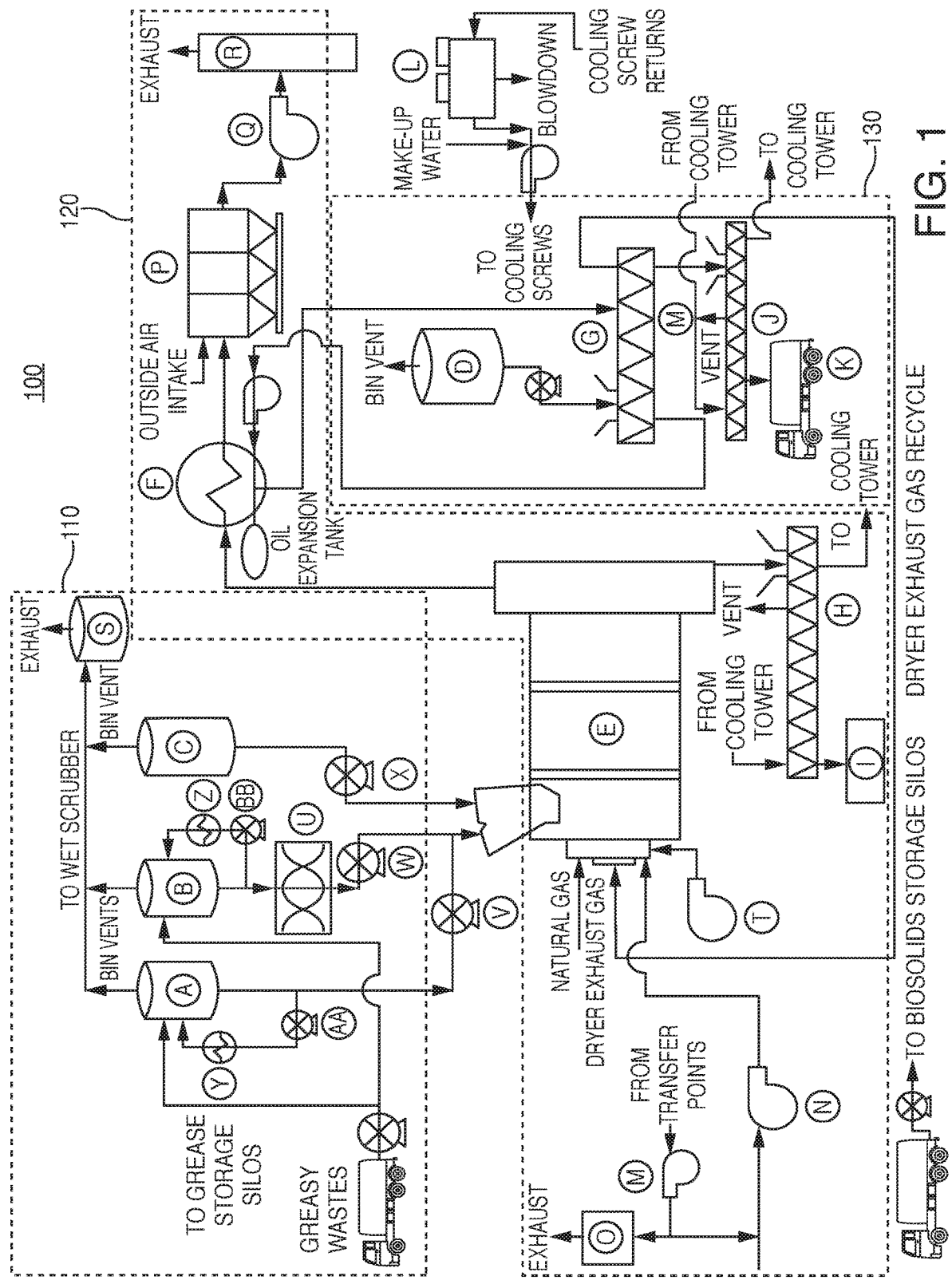
FIG. 1 is a schematic diagram of an exemplary thermal drying system in accordance with aspects of the present disclosure.

Referring to FIG. 1, there is shown a schematic diagram of a thermal drying system 100 in accordance with aspects of the present disclosure. The system 100 includes a sub-system 110 that receives and stores grease-related waste and/or oily waste, a sub-system 120 that burns the grease-related waste and/or oily waste to generate heat energy, and a sub-system 130 that receives bio-waste and uses the heat energy to dry the bio-waste into natural fertilizer. These sub-systems 110, 120, 130 will be described in more detail in connection with FIGS. 3-7. In various embodiments, the grease-related waste includes yellow grease, brown grease, and/or dewatered grease, and the bio-waste includes municipal sewer sludge and/or bio-solids. The grease-related waste and the oily waste can be obtained from restaurant/food facilities, waste water treatment plants, industrial factories, and/or animal carcass, among other sources. In various embodiments, other types of fuels are contemplated, including in general, non-hazardous waste having BTU sufficient for the operations described herein.

Figure 2:
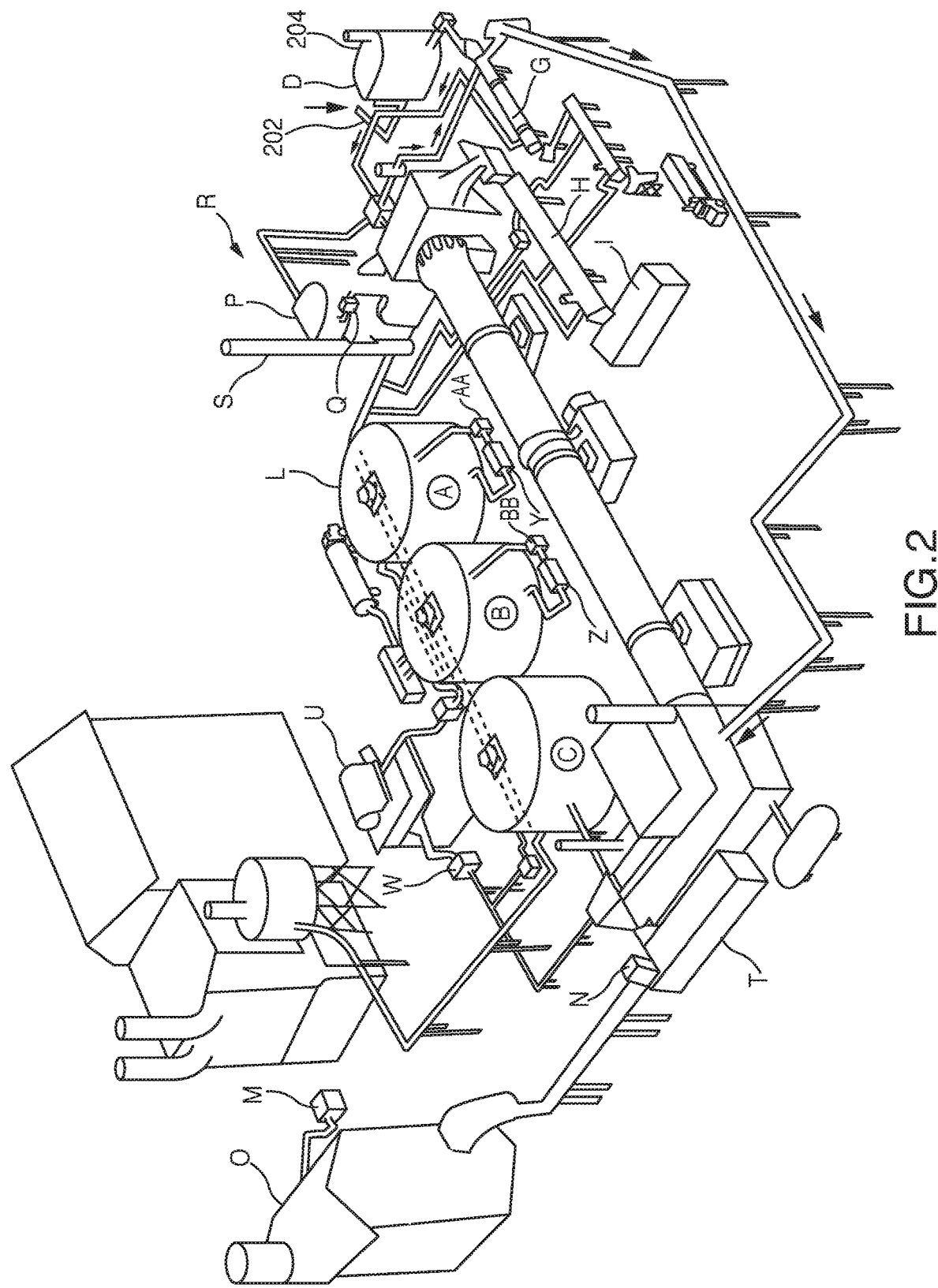
FIG. 2 is a diagram of an exemplary thermal drying facility corresponding to the schematic diagram of FIG. 1, in accordance with aspects of the present disclosure.

FIG. 2 shows a structural diagram of an exemplary thermal drying facility corresponding to the schematic diagram of FIG. 1. The arrangement of components, numbers of components, and types of components illustrated in FIG. 1 and FIG. 2 are exemplary and are not intended to limit the scope of the present disclosure. Other components and other arrangements and numbers of components are contemplated to be within the scope of the present disclosure. Furthermore, the facility and components of FIG. 2 are merely illustrative and may not be accurately scaled.

Figure 3:
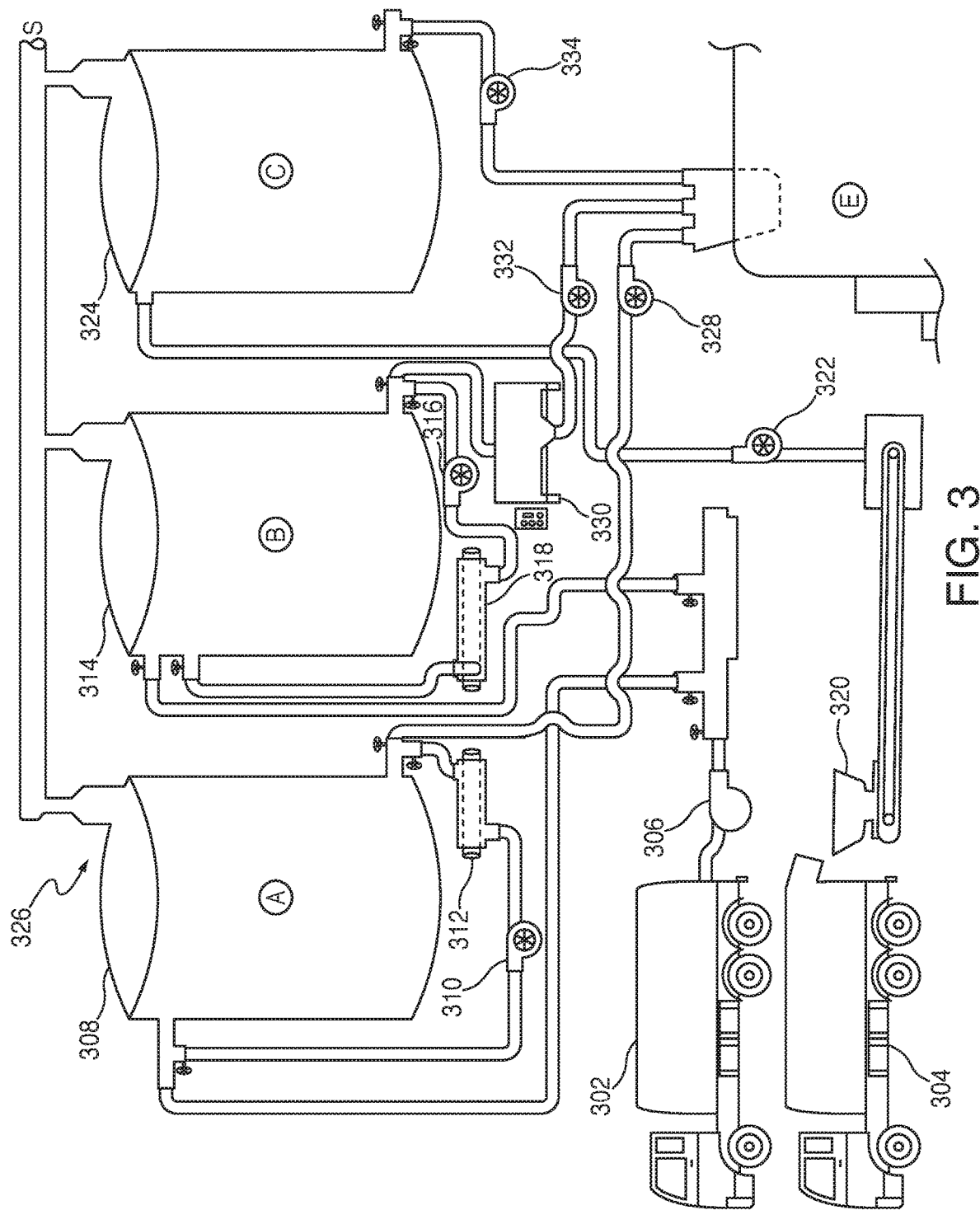
FIG. 3 is a diagram of a portion of the thermal drying facility of FIG. 2 for storing grease-related waste, in accordance with aspects of the present disclosure.

Referring to FIG. 3, there is shown a sub-system of the facility of FIG. 2 for receiving and storing grease-related waste. In various embodiments, the grease-related waste includes yellow grease, brown grease, and/or dewatered grease, which persons skilled in the art will recognize. Fats, oils, and greases form the vast majority of substances in yellow grease and brown grease. In accordance with aspects of the present disclosure, yellow and brown grease are received at the facility by tanker trucks 302, 304 and/or by railway, which may be available on-site at the facility.

Yellow grease can be off-loaded from tanker trucks 302 in an enclosed receiving area and transferred by pump 306 into a storage tank 308, which in various embodiments can be an insulated 100,000 gallon storage tank. The storage tank 308 can be equipped with a re-circulatory pump 310 and a yellow grease heat exchanger 312 to keep the yellow grease temperature above 120 degrees F. and to keep the yellow grease fluid.

Brown grease can separately be off-loaded from tanker trucks 302 in an enclosed receiving area and transferred via pump 306 into another storage tank 314, which in various embodiments can also be an insulated 100,000 gallon storage tank. The storage tank 314 can be equipped with a re-circulatory pump 316 and a brown grease heat exchanger 318 to keep the brown grease temperature above 120 degrees F. and to keep the brown grease fluid.

In various embodiments, dewatered grease may be received at the facility. Dewatered grease can be transferred from transfer trailers 304 into receiving chutes 320 and transferred via a positive displacement pump 322 to a separate storage tank 324, which can be a 475 cubic yard storage silo. In various embodiments, the transfer trailers 304 can include a push out trailer. In various embodiments, the receiving chutes 320 can include a hopper having a screw feeder. In various embodiments, the push out trailer and the screw feeder can be coordinated so that trailer off-load rate matches the screw feeder feed rate. In various embodiments, the receiving chutes 320 can include a fan (not shown) that provides negative air flow such that odors generally flow into the chute rather than out of the chute. In various embodiments, the storage tanks 308, 314, 324 can have other capacities and can be various types of storage tanks. In various embodiments, the heat exchangers 312, 318 can operate to maintain the grease temperatures at another temperature, and can maintain the yellow grease and the brown grease at different temperatures. Persons skilled in the art will understand the implementation of temperature control, including use of temperature sensors and control systems.

Figure 4:
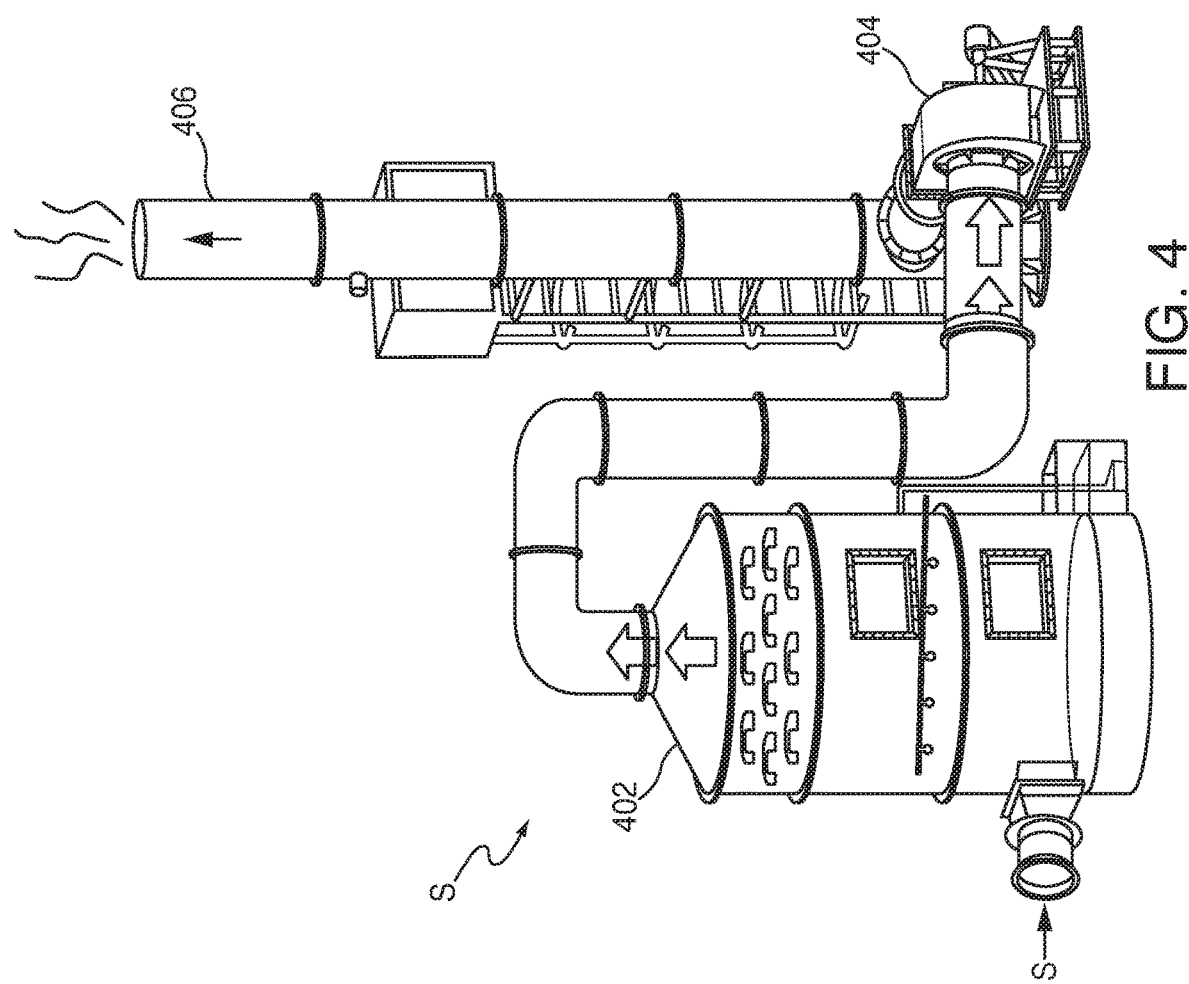
FIG. 4 is a diagram of a portion of the thermal drying facility of FIG. 2 for venting exhaust air, in accordance with aspects of the present disclosure.

In accordance with aspects of the present disclosure, and with reference also to FIG. 4, the storage tanks 308, 314, 324 are vented by ventilation conduits 326 under negative pressure to a wet scrubber 402 that treats the storage tank exhaust air prior to discharging the exhaust to the atmosphere. The wet scrubber 402 operates to remove certain particles and/or gases from exhaust air by collecting such substances in a liquid, thereby cleaning the exhaust. A fan 404 conveys the cleaned exhaust to an exhaust stack 406, where the cleaned exhaust is introduced into the atmosphere. Persons skilled in the art will understand the implementation and operation of a wet scrubber 402. In various embodiments, another air control device can be included in addition to or in place of the wet scrubber 402. FIG. 4 is exemplary, and other types and arrangements of air quality control systems are contemplated to be within the scope of the present disclosure.

Figure 5:
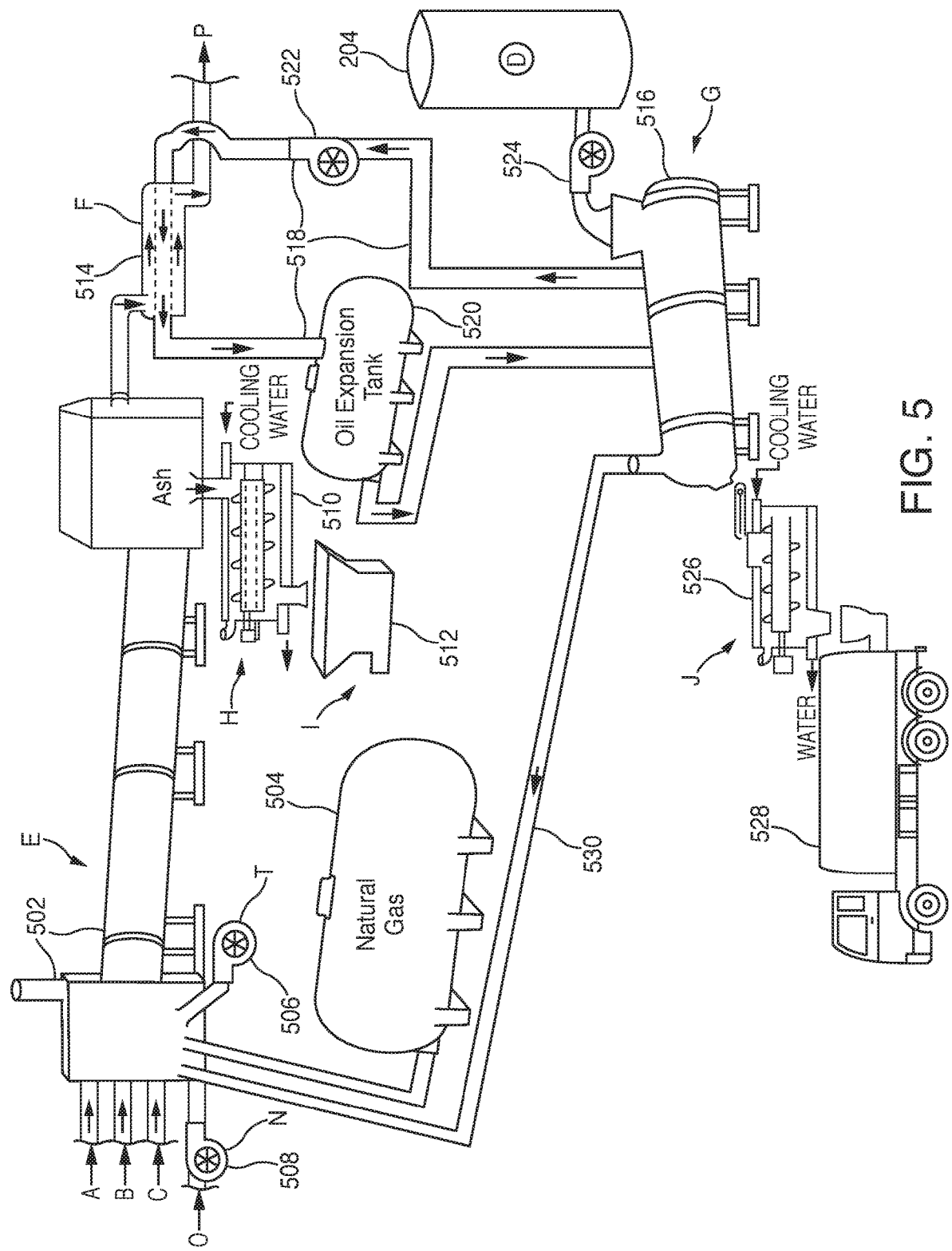
FIG. 5 is a diagram of other portions of the thermal drying facility of FIG. 2, in accordance with aspects of the present disclosure.

Referring now to FIG. 5, there is shown a structural diagram of other portions of the thermal drying facility, including portions of the sub-system that burns the grease-related waste to generate heat energy, and portions of the sub-system that receives bio-waste and uses the heat energy to dry the bio-waste into natural fertilizer. FIG. 5 includes a furnace 502 that receives and burns the grease-related waste to generate heat for the thermal drying process. In various embodiments, the furnace 502 can be a rotary kiln, which can utilize yellow grease, brown grease, and/or dewatered grease, or a blend or mixture of these fuel substances. In various embodiments, the furnace 502 can be supplemented by another fuel, such as natural gas 504 or another type of fuel.

Referring also to FIG. 3, in various embodiments, the furnace 502 is piped to receive the yellow grease via a variable flow controlled positive displacement metering pump 328. In various embodiments, the brown grease is discharged from the brown grease storage tank 314 to an insulated 3000-gallon capacity ribbon blender tank 330. The brown grease is piped via a variable flow controlled positive displacement metering pump 332 from the ribbon blender tank 330 to the furnace 502. In various embodiments, the furnace 502 can receive the dewatered grease via a variable flow controlled positive displacement metering pump 334. The particular types of pump or blender tank described herein are exemplary, and other types of pumps or blender tanks are contemplated to be within the scope of the present disclosure.

Referring again to FIG. 5, interior building air can used as combustion air for the furnace 502 and can be induced into the furnace 502 via a blower 506. In various embodiments, the interior building air can be supplemented by or replaced by air from various portions of the thermal drying system, which can be directed to the furnace by a fan 508, such as an air lance fan. In various embodiments, fan types other than an air lance fan can be used. In various embodiments, when the furnace 502 is not in operation, building air can be filtered by a carbon filter (not shown) then directed to the wet scrubber (FIG. 4, 402) for treatment prior to discharge into the atmosphere.

In accordance with aspects of the present disclosure, the furnace 502 and fuel intake pumps 328, 332, 334 can be configured to achieve a heated air temperature of 1500-1600° F. In various embodiments, another air temperature can be achieved. Persons skilled in the art will understand the implementation of temperature control, including use of temperature sensors and control systems. Ash byproduct from the furnace 502 can be transferred to an ash cooling conveyor 510 which can cool the ash. For example, the ash cooling conveyor 510 can include a screw conveyor that moves the ash and can include pipes that carry cool water to indirectly cool the ash as the ash advances through the screw conveyor. The cool water mechanism will be described in more detail in connection with FIG. 7. The ash exiting the ash cooling conveyor 510 can be deposited into an ash storage container 512. In various embodiments, the ash cooling conveyor can be vented, and the vent can include a filter. In various embodiments, another type of conveyor other than a screw conveyor can be utilized.

In accordance with aspects of the present disclosure, heated air from the furnace 502 passes through an oil heat exchanger 514, which heats oil using heat energy from the furnace air. The oil serves as a medium to convey heat. In various embodiments, the oil heat exchanger 514 is configured to heat the oil to at least 550° F. In various embodiments, the oil heat exchanger 514 can heat the oil to another temperature. Persons skilled in the art will understand the implementation of temperature control, including use of temperature sensors and control systems. The heated oil is used by a dryer 516 for thermal drying by way of indirect heating, which will be explained in more detail below. In various embodiments, the medium for conveying heat can be a substance other than oil. In various embodiments, the medium can include steam, glycol, and/or dielectric synthetics, among other substances.

Figure 6:
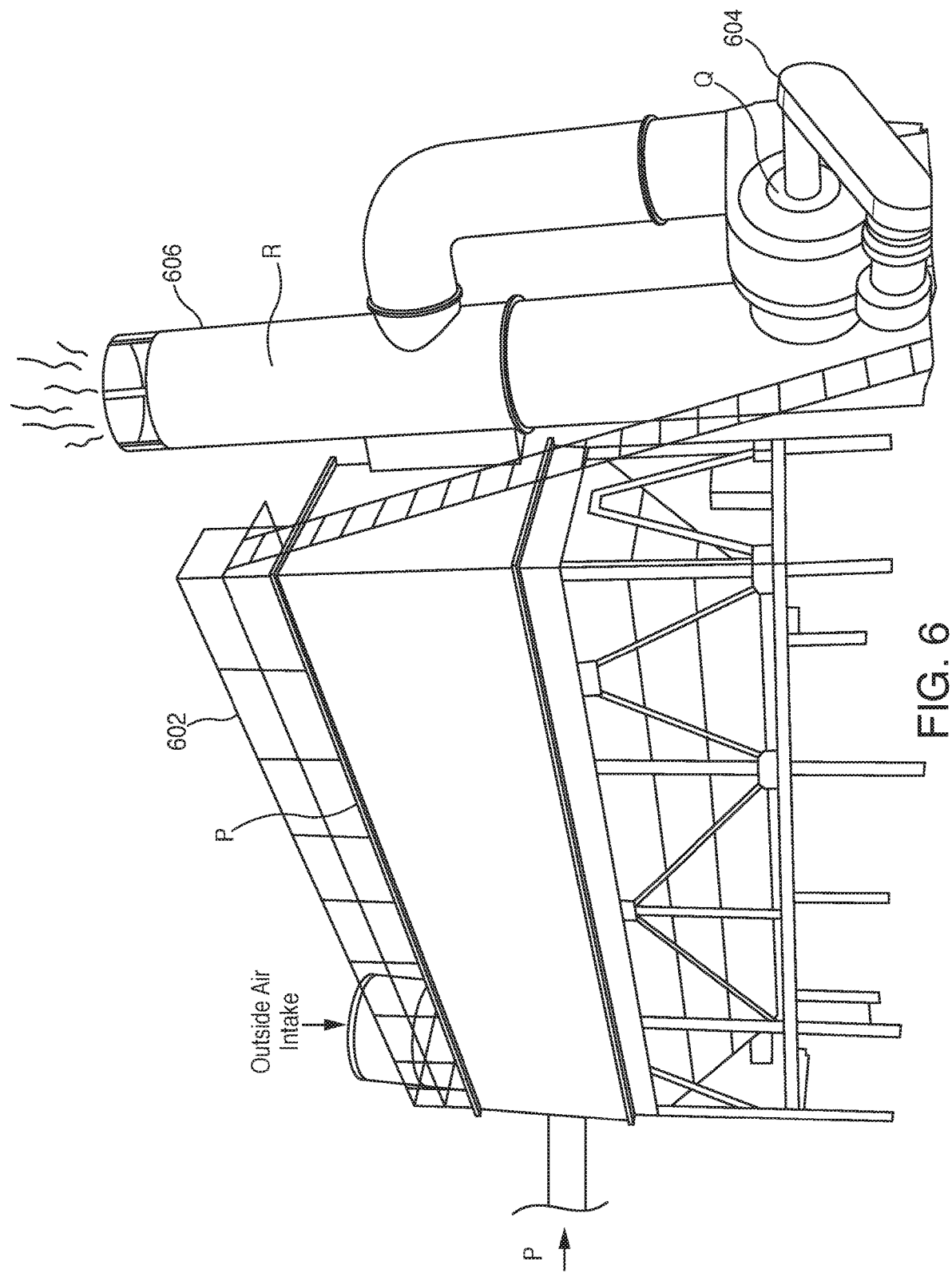
FIG. 6 is a diagram another portion of the thermal drying facility of FIG. 2 for cleaning exhaust air, in accordance with aspects of the present disclosure.

The furnace air exiting the oil heat exchanger 514 continues to an air cleaning system, which is shown in FIG. 6. The system of FIG. 6 includes a bag house 602 coupled to the furnace 502 that removes particulates from the furnace air. Persons skilled in the art will understand the implementation and operation of the bag house 602. In various embodiments, the air cleaning system can include another type of cleaning mechanism other than a bag house 602. The furnace air is induced into the bag house by a fan 604, which can be an induced draft fan. The fan 604 also operates to move air within and through the furnace 502. The cleaned air exiting the bag house 602 is then introduced to the atmosphere through an exhaust stack 606.

Referring again to FIG. 5, as mentioned above, the oil heated by the oil heat exchanger 514 is used by the dryer 516 for thermal drying. A circulatory conduit 518 for the oil includes a forward conduit path from the oil heat exchanger 514 to the dryer 516 and a return conduit path form the dryer 516 back to the oil heat exchanger 514. The forward conduit path can include an oil expansion tank 520, which provides space for the oil to safely expand while it is heated. The return conduit path can include a pump 522 that circulates the oil. In various embodiments, the expansion tank 520 and the pump 522 can be positioned in different locations.

Accordingly, what have been described above are systems and methods for storing and burning fuel to generate heat and for processing combustion byproducts before they are introduced into the environment. The description below relate to using the generated heat for thermal drying of bio-waste to produce natural fertilizer.

With reference to FIG. 2 and FIG. 5, in accordance with aspects of the present disclosure, bio-waste is received and stored at the facility. As shown in FIG. 2, in various embodiments, the bio-waste can include bio-solids and/or dewatered municipal sewage sludge, which can be received in a receiving chute 202 from trailers, such as 40 cubic yard push out transfer trailers. The receiving chute 202 can be equipped with a positive displacement pump (not shown) that transfers the bio-waste into a storage tank 204, which can be a 475 cubic yard storage silo. In various embodiments, the push out trailer and the positive displacement pump can be coordinated so that trailer off-load rate matches the pump rate. In various embodiments, the receiving chutes 202 can include a fan (not shown) that provides negative air flow such that odors generally flow into the chute rather than out of the chute. In various embodiments, the storage tank 204 and pump can be other types than those described above.

Referring to FIG. 5, the bio-waste is metered from the storage tank 204 into the dryer 516 via a positive displacement pump 524. In various embodiments, the pump 524 can feed the bio-waste into the dryer 516 at an adjustable rate between 3.2 metric tons to 5.45 metric tons per hour. In various embodiments, the adjustable rate can be less than 3.2 metric tons per hour or more than 5.45 metric tons per hour. In various embodiments, the dryer 516 can be an indirect rotary dryer that includes augers for moving the bio-waste through the dryer 516. The auger (not shown) can be hollow and the heated oil can circulate through the hollow augers within the dryer 516 to indirectly heat the bio-waste. Accordingly, the hollow augers can form a portion of the oil-circulating conduit 518. In this manner, heat is indirectly applied to the bio-waste rather than being directly applied to the bio-waste by, for example, heated air.

In accordance with aspects of the present disclosure, the dryer 516 and the bio-waste feed rate can be coordinated so that the dried bio-waste exiting the dryer has 90%-100% solid content, which is appropriate for using the dried bio-waste as fertilizer. In various embodiments, the percentage can be 50%-100% solid content, such as 60% solid content. In various embodiments, the feed rate can be adjusted based on the percentage of solids in the bio-waste entering the dryer 516 and based on the temperature within the dryer 516. For example, if the temperature inside the dryer 516 decreases or increases, the feed rate can decrease or increase correspondingly, so that the dryer 516 could still achieve a solid content of 90%-100% or 50%-100% in the bio-waste exiting the dryer 516. As another example, if the percentage of solids of the bio-waste entering the dryer 516 is a lower percentage of solids (i.e., higher percentage of liquids), the feed rate can be lower so that the dryer 516 could still achieve a solid content of 90%-100% or 50%-100% in the bio-waste exiting the dryer. On the other hand, if the percentage of solids of the bio-waste entering the dryer 516 is a higher percentage of solids (i.e., lower percentage of liquids), the feed rate can be higher. In various embodiments, the feed rate can be adjusted between 3.2 metric tons to 5.45 metric tons per hour. In various embodiments, the adjustable rate can be less than 3.2 metric tons per hour or more than 5.45 metric tons per hour. The bio-waste feed rate can be adjusted by a controller (not shown), which persons skilled in the art will understand.

In various embodiments, in addition to an adjustable rate of feeding materials into the dryer 516, the temperature within the dryer 516 and the speed of the auger in the dryer 516 can also be adjustable and controlled. For example, the temperature within the dryer 516 can be controlled to be higher or lower to dry the material faster or slower, respectively, and the speed of the auger can be controlled to be faster or slower to decrease or increase retention time of the material within the dryer 516, respectively. For example, if the percentage of solids in the bio-waste entering the dryer is about 22%, the temperature within the dryer 516 is about 515° F., and the retention time of the bio-waste within the dryer 516 is about 210 minutes, the bio-waste exiting the dryer 516 can achieve a solids percentage of about 91-92%. The controller and control mechanism for controlling the temperature and auger speed will be known to persons skilled in the art.

The dried bio-waste exiting the dryer 516 can be discharged to an enclosed cooling conveyor 526, which can be a screw conveyor. In various embodiments, the cooling conveyor 526 can include pipes that carry cool water, which can indirectly cool bio-waste in contact with the pipes. The bio-waste exiting the cooling conveyor 526 can be transferred to a truck loading station 528, which can deliver the bio-waste as natural fertilizer. In various embodiments, the cooling conveyer 526 can be another type of conveyor and can utilize another cooling mechanism.

In one aspect of the present disclosure, the dryer 516 does not generate any liquid or condensate in drying the bio-waste. Generally, dryers operate to extract moisture from the substance being dried, and the moisture eventually condenses into liquid form and needs to be discharged. In certain typical factories, hundreds of gallons or thousands of gallons of condensate may need to be discharged daily as liquid waste of the drying process. In accordance with aspects of the present disclosure, the dryer 516 of the present disclosure does not require any condensate or liquid discharge conduits. Rather, gases and moisture from the dryer 516 are conveyed to the furnace 502 via a gas conduit 530. For facilities that utilize indirect dryers, there is no known facility that does not require liquid or condensate discharge lines.

The gases and moisture from the dryer 516 have some degree of heat, and when these gases and moisture are conveyed to the furnace 502, this heat is utilized to some extent by the furnace 502. Additionally, the gases from the dryer 516 include volatile organics, which can be destroyed by the high air temperature in the furnace 502 and/or can be cleaned by the bag house (FIG. 6, 602), in accordance with the features described above in connection with FIG. 6. In various embodiments, the gas conduit 530 may not include a gas fan and can convey gases from the dryer 516 to the furnace 502 using negative pressure. In various embodiments, the gas conduit 530 includes a gas fan (not shown) that conveys the gases through the gas conduit 530. In various embodiments, a facility that is configured as disclosed herein permits the gas fan to effectively remove gases and moisture from the dryer 516 when operating at about 40 CFM. Another advantage of the disclosed system is that the dryer 516 does not itself need any cooling mechanism to cool heated air within the dryer 516.

Figure 7:
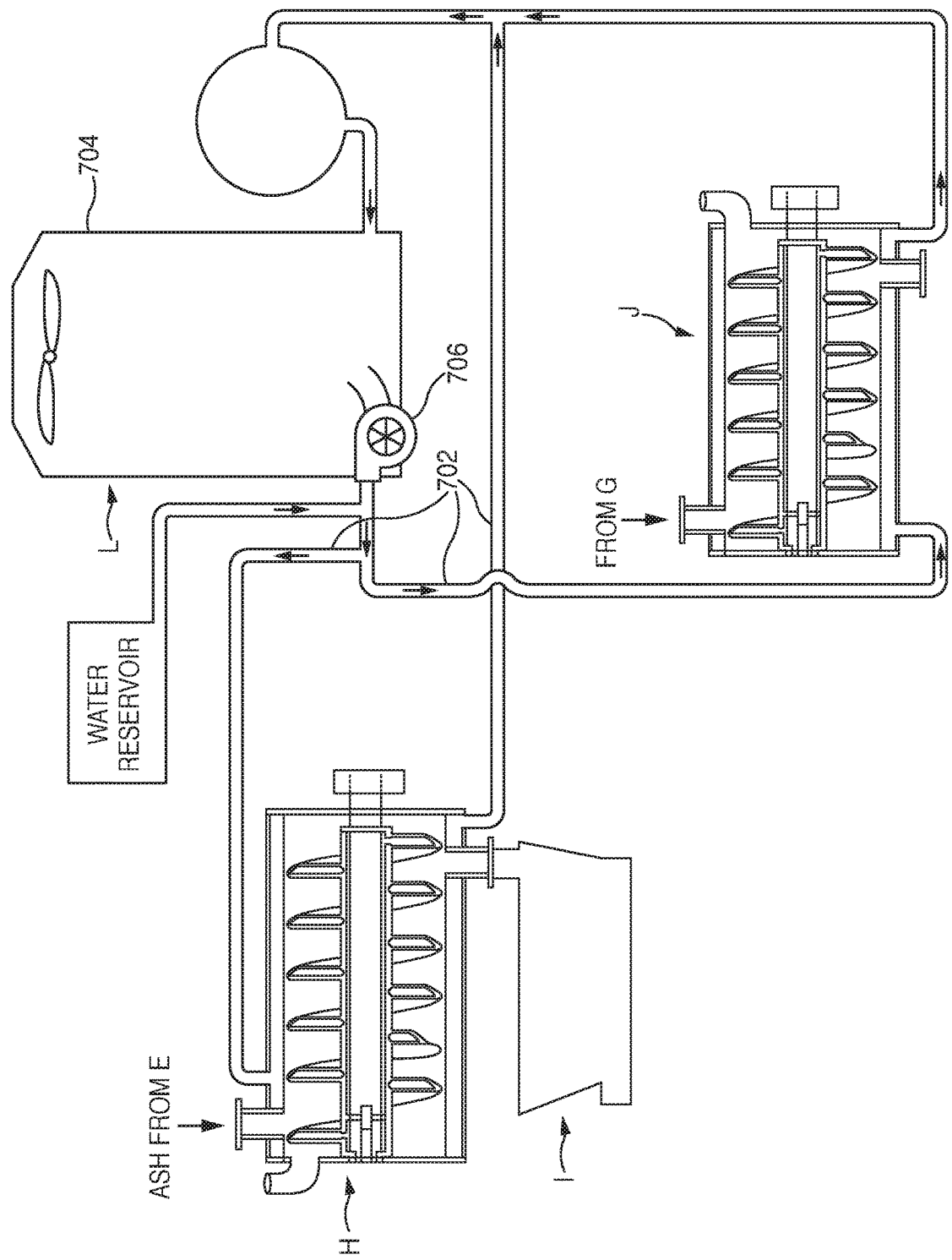
FIG. 7 is a diagram of another portion of the thermal drying facility of FIG. 2 for storing heat generation waste, in accordance with aspects of the present disclosure.

Referring now also to FIG. 7, there is shown a system for providing cool water for use in the ash cooling conveyor 510 and/or in the bio-waste cooling conveyor 526. In FIG. 7, a water reuse conduit loop 702 is provided with a cooling tower 704 that operates to cool water returning from the ash cooling conveyor 510 and/or the bio-waste cooling conveyor 526. The cooling tower 704 receives warm water returning from the ash cooling conveyor 510 and/or the bio-waste cooling conveyor 526 and reduces the temperature of the water. The cooling tower 704 then returns the cooled water via a pump 706 to the ash cooling conveyor 510 and/or to the bio-waste cooling conveyor 526. Persons skilled in the art will understand the implementation and operation of a cooling tower 704.

Accordingly, what have been described are systems and methods for environmentally-clean thermal drying. As described above, the inputs to the disclosed system and outputs from the disclosed system are environmentally friendly. The fuel for the thermal drying is natural grease-related waste, and combustion byproducts are cleanly processed before they are discharged into the environment. Additionally, the input ingredient that is thermally dried is natural bio-waste, and the dried bio-waste is used as fertilizer. Thus, the input ingredient and the output product are also environmentally friendly. In this manner, waste products are put to use in an environmentally-clean way to produce a natural fertilizer product.

As an example of a configuration of the disclosed system, and with reference to FIG. 1, the reference letters of FIG. 1 can refer to the following specific components: AA—recirculation pump, BB—recirculation pump, A—yellow grease storage tank, B—brown grease storage tank, C—dewatered grease cake storage, D—dewatered biosolids storage tank, E—rotary kiln, F—oil heater, G—indirect dryer, H—ash cooling screw conveyer, I—ash storage container, J—dryer product cooling screw connection, K—product loadout station, L—cooling tower, M—fugitive air fan, N—air lance fan, O—activated carbon filter, P—bag house, Q—fan, R—stack, S—wet scrubber, T—kiln blower, U—ribbon blender, V—variable flow displacement metering pump, W—variable flow displacement metering pump, X—variable flow displacement metering pump, Y—heat exchanger, and Z—heat exchanger.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems described herein may also utilize one or more controllers to receive various information and transform the received information to generate an output. For example, any of the temperatures, fans, pumps, and/or conveyors can utilize a controller. In various embodiments, the controller can permit a user to control device operation in real time, such as temperatures to be achieved, fan speed, pump throughput, and/or conveyor throughput. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes, such as an adjustable feed rate, may be implemented by, converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A method for thermal drying, comprising:
   receiving a grease-related waste;
   burning the grease-related waste in a furnace to generate heat energy;
   transferring the heat energy from the furnace to an oil circulating conduit holding oil to heat the oil, the oil circulating conduit including:
     an oil heat exchanger at a first end of the oil circulating conduit;
     a forward conduit path including an oil expansion tank arranged along the forward conduit path, the forward conduit path connecting the oil heat exchanger with an indirect dryer at a second end of the oil circulating conduit; and
     a return conduit path connecting the indirect dryer and the oil heat exchanger, wherein the return conduit path is unconnected with the oil expansion tank;
   receiving a bio-waste in the indirect dryer at an adjustable feed rate;
   transferring the heated oil along the forward conduit path to the indirect dryer;
   drying the bio-waste in the indirect dryer using the heated oil;
   transferring the heated oil along the return conduit path from the indirect dryer to the oil heat exchanger without passing the heated oil through the oil expansion tank; and
   metering the bio-waste into the indirect dryer at the adjustable feed rate, the adjustable feed rate being adjusted based on a percentage of solids of the bio-waste entering the indirect dryer and a temperature within the indirect dryer,
   wherein the indirect dryer and the adjustable feed rate are coordinated to achieve a predetermined percentage of solids in a dried bio-waste exiting the indirect dryer.

2. The method of claim 1, wherein the predetermined percentage of solids in the dried bio-waste exiting the indirect dryer is between 90% and 100%.

3. The method of claim 1, further comprising transferring the dried bio-waste to a loading station via a cooling conveyor.

4. The method of claim 3, further comprising indirectly cooling the dried bio-waste exiting the indirect dryer using a cool-water conduit loop, the cool-water conduit loop coupled to the cooling conveyor.

5. The method of claim 1, wherein the grease-related waste includes at least one of: a yellow grease, a brown grease, or a dewatered grease cake, and wherein the bio-waste includes municipal sewage sludge.

6. The method of claim 1, further comprising adjusting at least one of: the temperature within the indirect dryer and a retention time of the bio-waste in the indirect dryer.

7. The method of claim 1, wherein the heat energy is in the form of heated air, and wherein drying the bio-waste in the indirect dryer using at least a portion of the heat energy includes:
heating a first portion of an oil-circulating conduit using the heated air to heat oil contained within the oil-circulating conduit, wherein the first portion is outside the indirect dryer, and wherein a second portion of the oil-circulating conduit is located within the indirect dryer; and
circulating the heated oil through the second portion of the oil-circulating conduit within the indirect dryer.

8. The method of claim 7, wherein the second portion of the oil-circulating conduit is a hollow auger of the indirect dryer.

9. The method of claim 1, further comprising:
conveying heated gases from the indirect dryer to the furnace through a gas conduit using negative pressure, such that the indirect dryer does not include any waste liquid or condensate discharge line; and
destroying, in the furnace, volatile organic compounds and odors in the heated gases conveyed from the indirect dryer to the furnace,
wherein the furnace generates the heat energy based in part on the heated gases conveyed from the indirect dryer to the furnace.

10. The method of claim 9, further comprising cleaning exhaust gases from the furnace, the exhaust gases including at least some of the gases conveyed from the indirect dryer to the furnace.

11. A system for thermal drying, comprising:
a storage tank storing a grease-related waste;
a furnace that receives and burns the grease-related waste to generate heat energy;
an oil circulating conduit connected with the furnace, wherein the oil circulating conduit holds oil, wherein the heat energy from the furnace is used to heat the oil, the oil circulating conduit including:
an oil heat exchanger at a first end of the oil circulating conduit;
a forward conduit path including an oil expansion tank arranged along the forward conduit path, the forward conduit path connecting the oil heat exchanger with an indirect dryer at a second end of the oil circulating conduit; and
a return conduit path connecting the indirect dryer and the oil heat exchanger, wherein the return conduit path is unconnected with the oil expansion tank;
the indirect dryer arranged to receive a bio-waste, the indirect dryer utilizing the heated oil to dry the bio-waste; and
a pump that meters the bio-waste into the indirect dryer at an adjustable feed rate, the adjustable feed rate being adjusted based on a percentage of solids of the bio-waste entering the indirect dryer and a temperature within the indirect dryer,
wherein the indirect dryer and the adjustable feed rate are coordinated to achieve a predetermined percentage of solids in a dried bio-waste exiting the indirect dryer.

12. The system of claim 11, wherein the predetermined percentage of solids in the dried bio-waste exiting the indirect dryer is between 90% and 100%.

13. The system of claim 11, further comprising a cooling conveyor operatively coupled to the indirect dryer, the cooling conveyor transferring the dried bio-waste to a loading station.

14. The system of claim 13, further comprising a cool-water conduit loop coupled to the cooling conveyor, the cool-water conduit indirectly cooling the dried bio-waste.

15. The system of claim 11, wherein the grease-related waste includes at least one of: a yellow grease, a brown grease, or a dewatered grease cake, and wherein the bio-waste includes municipal sewage sludge.

16. The system of claim 11, further comprising a controller configured to adjust at least one of: the temperature within the indirect dryer and a retention time of the bio-waste in the indirect dryer.

17. The system of claim 11, wherein the heat energy is in the form of heated air,
the oil heat exchanger heating the oil within the oil-circulating conduit using the heated air, wherein a first portion of the oil-circulating conduit is outside the indirect dryer and a second portion of the oil-circulating conduit is within the indirect dryer; and
an oil-circulating pump coupled to the oil-circulating conduit, the oil-circulating pump circulating the heated oil through the second portion of the oil-circulating conduit within the indirect dryer.

18. The system of claim 17, wherein the second portion of the oil-circulating conduit is a hollow auger of the indirect dryer.

19. The system of claim 11, further comprising a gas conduit coupled between the indirect dryer and the furnace, the gas conduit conveying heated gases from the indirect dryer to the furnace using negative pressure such that the indirect dryer does not include any waste liquid or condensate discharge line,
wherein the furnace generates the heat energy based in part on the heated gases conveyed from the indirect dryer to the furnace, and destroys volatile organic compounds and odors in the heated gases conveyed from the indirect dryer to the furnace.

20. The system of claim 19, further comprising a bag house operatively coupled to the furnace, the bag house cleaning exhaust gases from the furnace, wherein the exhaust gases including at least some of the gases conveyed from the indirect dryer to the furnace.

21. A method for thermal drying, comprising:
receiving a grease-related waste;
burning the grease-related waste in a furnace to generate heat energy, the furnace including a rotary kiln;
receiving a bio-waste in an indirect dryer at an adjustable feed rate;
drying the bio-waste in the indirect dryer using at least a portion of the heat energy wherein drying the bio-waste in the indirect dryer generates uncleaned heated gases;
metering the bio-waste into the indirect dryer at the adjustable feed rate, the adjustable feed rate being adjusted based on a percentage of solids of the bio-waste entering the indirect dryer and a temperature within the indirect dryer, wherein the indirect dryer and the adjustable feed rate are coordinated to achieve a predetermined percentage of solids in a dried bio-waste exiting the indirect dryer;

conveying all of the uncleaned heated gases from the indirect dryer to the rotary kiln of the furnace through a gas conduit using negative pressure, such that the indirect dryer does not generate any liquid or condensate discharge in drying the bio-waste; and destroying, in the rotary kiln of the furnace, volatile organic compounds, particulate matter and odors in the uncleaned heated gases conveyed from the indirect dryer to the rotary kiln of the furnace, wherein the furnace generates the heat energy based in part on the uncleaned heated gases conveyed from the indirect dryer to the rotary kiln of the furnace.

\* \* \* \* \*